Aug. 24, 1965 R. RICE ETAL 3,202,823

PHOTOSENSITIVE ASYNCHRONOUS INFORMATION HANDLING SYSTEM

Filed Dec. 28, 1962 6 Sheets-Sheet 1

INVENTORS
REX RICE
RENÉ H. TERLET

BY Curtis Riley Jr.
ATTORNEY

Aug. 24, 1965 R. RICE ETAL 3,202,823
PHOTOSENSITIVE ASYNCHRONOUS INFORMATION HANDLING SYSTEM
Filed Dec. 28, 1962 6 Sheets-Sheet 2

Aug. 24, 1965 R. RICE ETAL 3,202,823

PHOTOSENSITIVE ASYNCHRONOUS INFORMATION HANDLING SYSTEM

Filed Dec. 28, 1962 6 Sheets-Sheet 5

3,202,823
PHOTOSENSITIVE ASYNCHRONOUS INFORMATION HANDLING SYSTEM

Rex Rice, Poughkeepsie, N.Y., and René H. Terlet, San Jose, Calif., assignors to International Business Machines Corporation, New York, N.Y., a corporation of New York Filed Dec. 28, 1962, Ser. No. 248,077
14 Claims. (Cl. 250—209)

Figure 1:
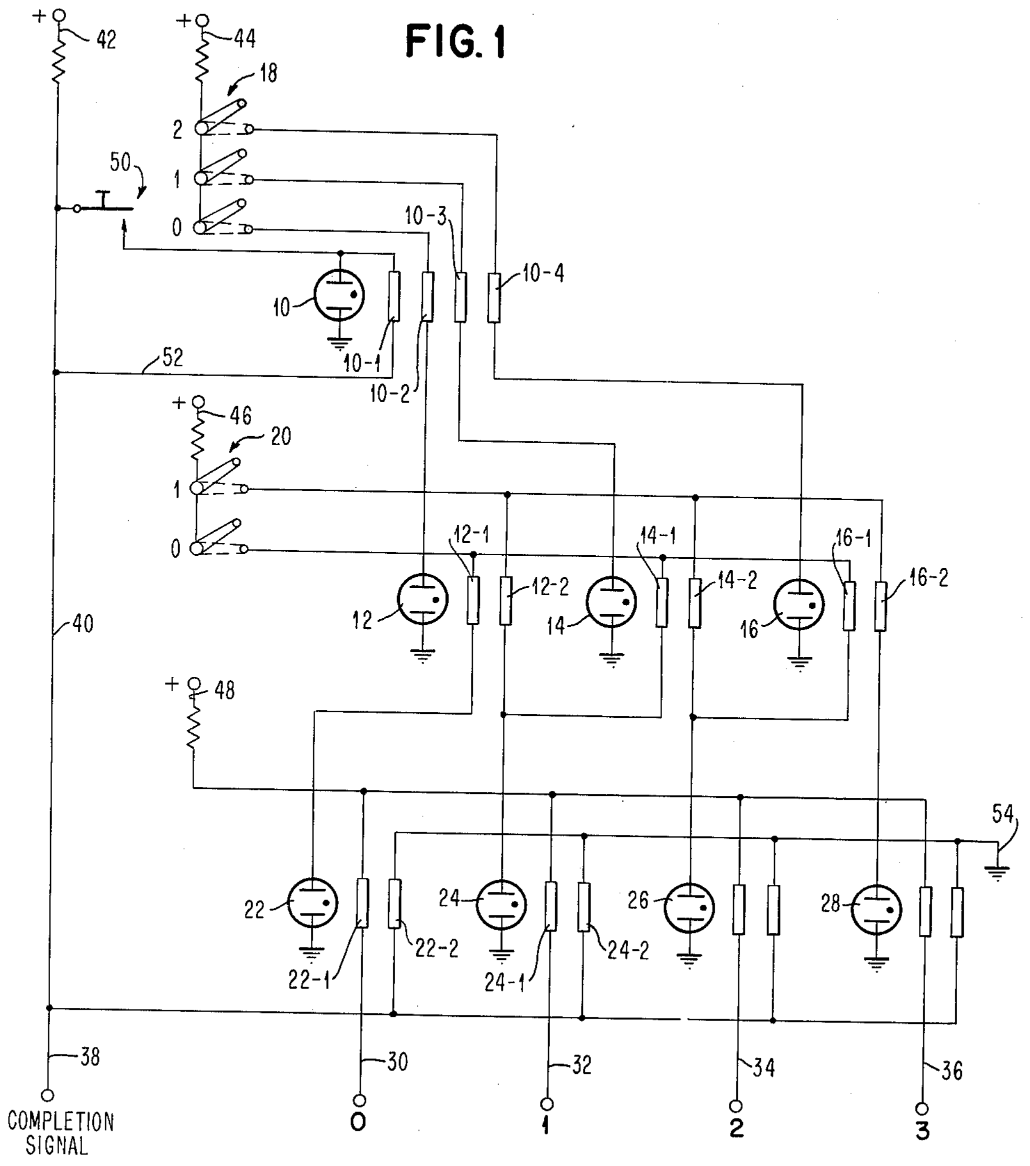

This invention relates to information handling systems which are adapted for asynchronous operation, and more particularly to a system which includes the means for timing its own operations so that it operates at its own best speed without the need for a timing clock, or a central source of clock pulses.

One of the major objectives in the design of data and information handling systems, and computing systems, is to obtain a high speed of operation at a minimum cost for the components and for the system. One of major obstacles in obtaining high speeds with inexpensive components in the usual data handling apparatus arises from the fact that each system operates synchronously in response to a central source of clock pulses. Such clocked, or synchronous, systems necessarily require that there be a high degree of uniformity in the operating characteristics of the individual components so that each component will operate reliably within a single clock pulse period. Furthermore, provision must be made for apparatus to supply the clock pulses, with proper amplification, throughout the system.

Therefore, it is one of the objectives of the present invention to overcome the requirement of extreme uniformity in component operating characteristics, and to eliminate the need for clocking and timing circuits, by providing a system which operates asynchronously.

Another problem in producing a high speed information handling apparatus with inexpensive components is that because the comopnents are lacking in uniformity in operating characteristics, the clock pulse timing period for the operation of each component (or each stage) must be selected to be of sufficient duration to assure positive operation of the slowest component.

Therefore, it is another objective of the present invention to provide an asynchronous system which will accommodate for wide variations between the operating characteristics of various similar components, and which will accommodate also for variations in the operating speed characteristics of individual components as they may vary from time to time in response to aging, or temperature conditions or other factors.

Another problem encountered in data handling systems involves the requirement that there are often different data channels through which the information must be transmitted and processed before the data and information channels converge. These various data channels may necessarily be of different lengths, in terms of the number of logical stages involved, and in terms of the amount of logic which must be performed. In the usual synchronous data handling system, the shorter data channel therefore must include delay stages merely for the purpose of maintaining the information in the short data channel, and for artificially lengthening that data channel to match exactly the length of the longer data channel so that they will converge at the proper clock pulse time and in a proper way. Therefore it is another object of the present invention to provide data handling and logical systems in which converging data channels of inherently different lengths are automatically accommodated for without the need for clocked delay devices in the shorter channels.

One of the promising technologies in information handling and logical systems may be characterized as "photoconductor" logic. This refers to systems employing switching devices, each of which is composed of a voltage responsive light source and one or more photoconductive circuit elements arranged for illumination by that light source. However, one of the most serious problems in employing the photoconductor logic devices in systems is the wide variation in operating speeds from one device to another and with a single device under varying operating conditions.

Accordingly, it is another objective of this invention to provide asynchronous information handling systems which are particularly well-adapted for embodiment with photoconductor logic components, and which will take advantage of all of the operating speed which is available from each component under whatever conditions are encountered.

In carrying out the above objects of this invention in one preferred embodiment thereof there is provided an asynchronous information handling system including at least one chain of logical stages and having an energizing means for each of the stages. Each of the stages include at least one switching device and at least some of the stages include a plurality of switching devices. Each of the devices is operable in response to completion of a circuit from its energizing means and each operable device is effective to complete an information transfer circuit from the energizing means for a succeeding stage to one of the devices for that succeeding stage. Switching means is provided for initiatin and maintaining the operation of one of the devices of the first stage, and all of the stages are interconnected to ultimately cause the operation of a single final stage. Means are provided and connected for response to the operation of any of the devices of the final stage for disabiling the energizing means for at least the first stage to release the system for the reception of further information. In a modified embodiment the last named means may be operable for disabling all of the energizing means for all of the stages for substantially simultaneous release of all of the stages.

For a more complete understanding of the invention, attention is directed to the following specification and the accompanying drawings which are as follows:

FIGURE 1 is a schematic circuit diagram illustrating a photoconductor logic embodiment of the present invention.

Figure 1A:
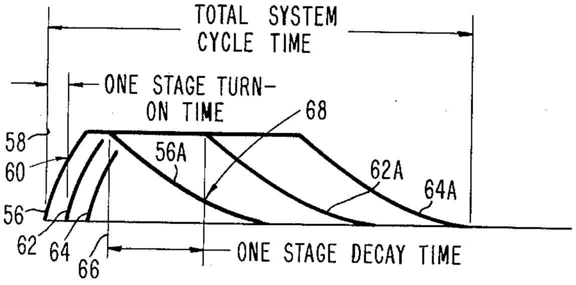

FIGURE 1*a* is a timing diagram illustrating a typical operation of the embodiment of FIGURE 1.

Figure 1B:
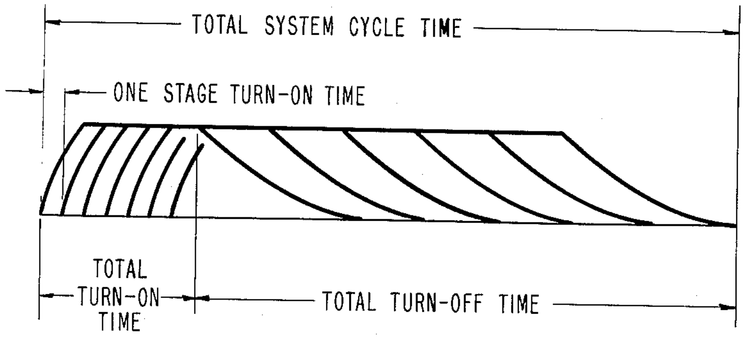

FIGURE 1*b* is a timing diagram illustrating the operation of a larger system constructed according to FIGURE 1.

Figure 2A:
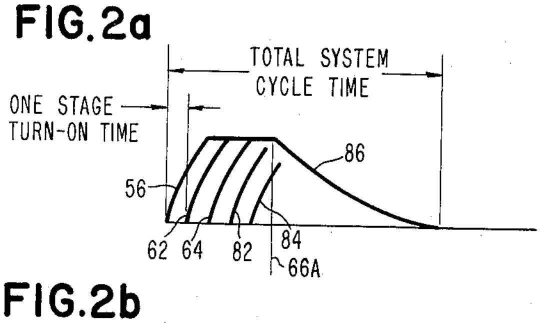
Figure 2B:
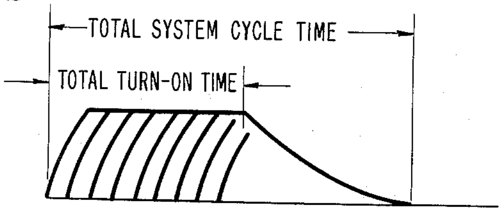
Figure 2:
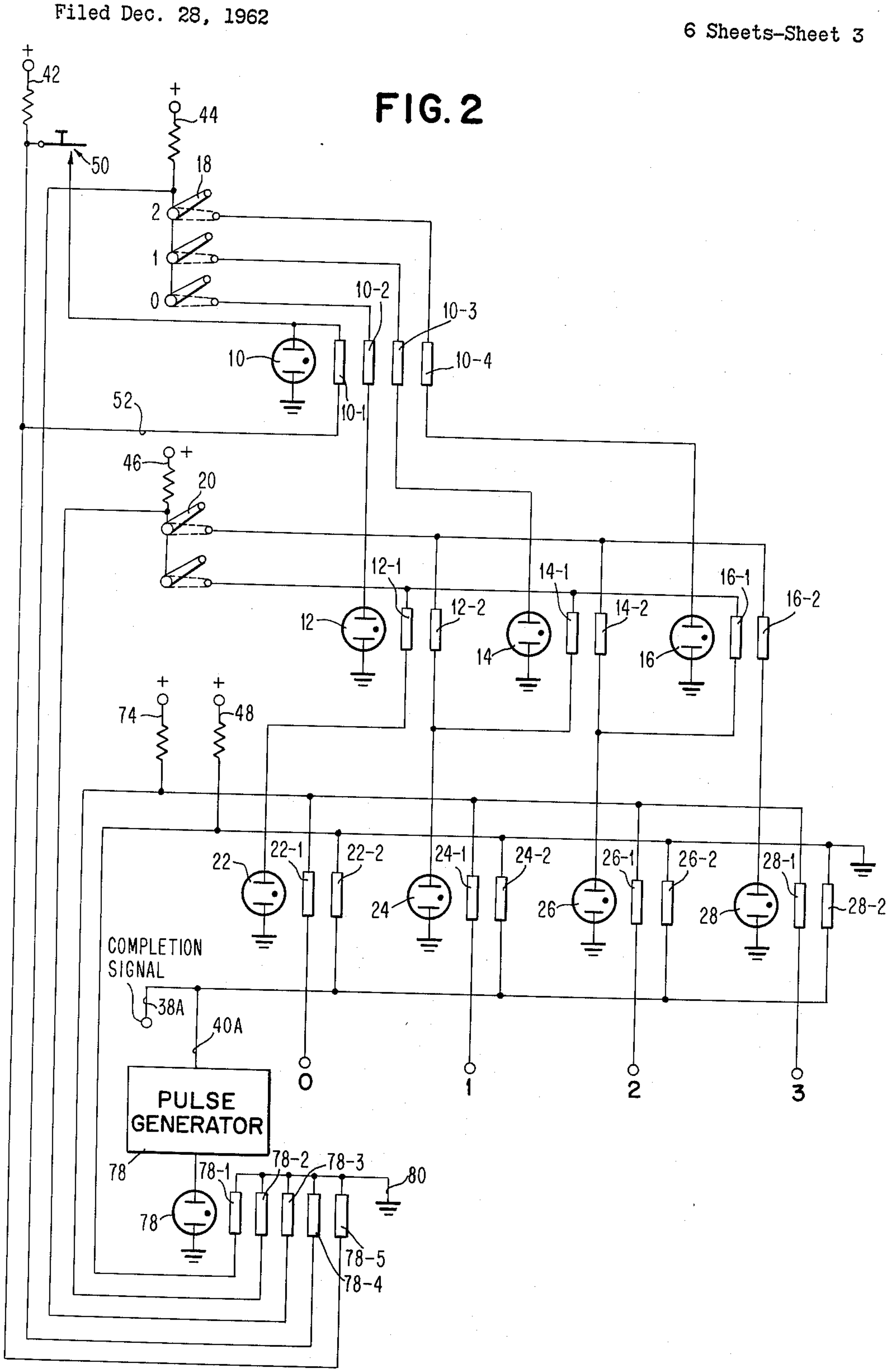

FIGURE 2 is a schematic circuit diagram illustrating a modified photoconductor logic embodiment of the present invention which provides certain advantages over the embodiment of FIGURE 1.

FIGURE 2*a* is a timing diagram illustrating a typical operation of a system such as illustrated in FIGURE 2.

FIGURE 2*b* is a timing diagram illustrating a typical operation of a larger system constructed according to FIGURE 2.

Figure 3:
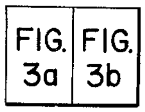
Figure 3A:
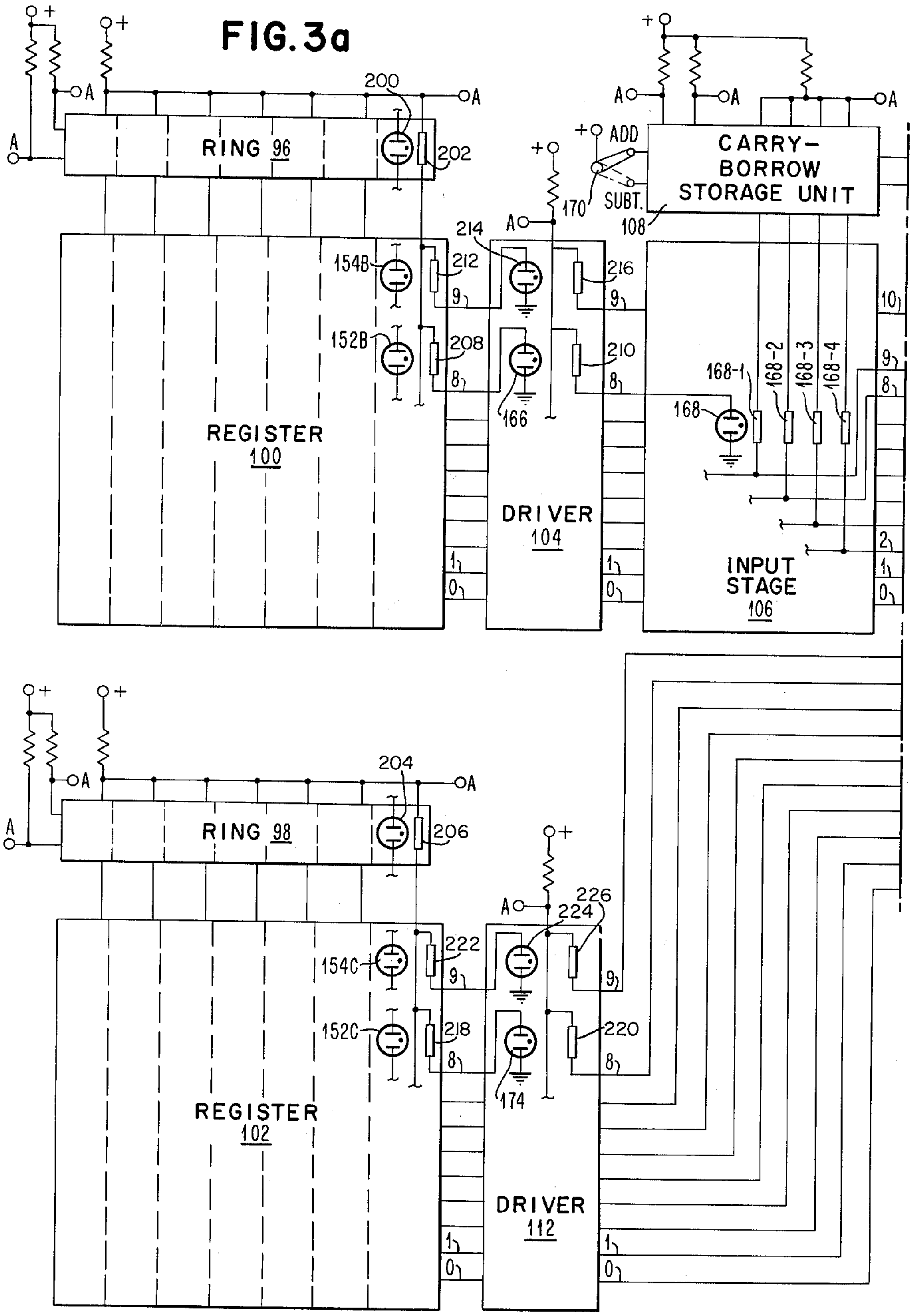
Figure 3B:
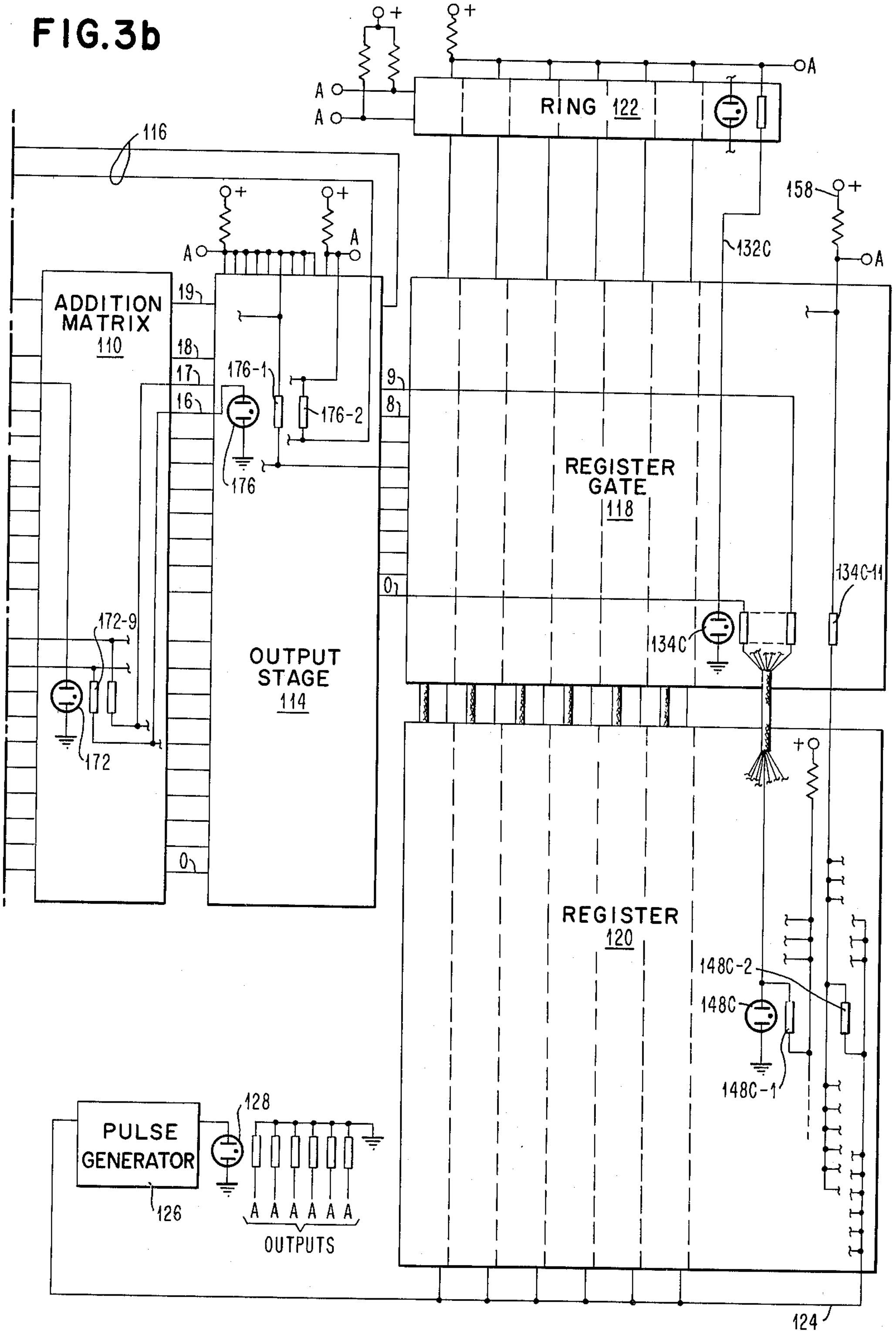

FIGURE 3 is a composite diagram showing how the FIGURES 3*a* and 3*b* are arranged together to form a schematic circuit diagram of an embodiment of a larger system which constitutes an embodiment of the present invention. This system is capable of performing addition and subtraction. Since FIGURE 3 incorporates FIGURES 3*a* and 3*b*, as a matter of convenience, these FIGURES are referred to collectively below as FIGURE 3.

Figure 4:
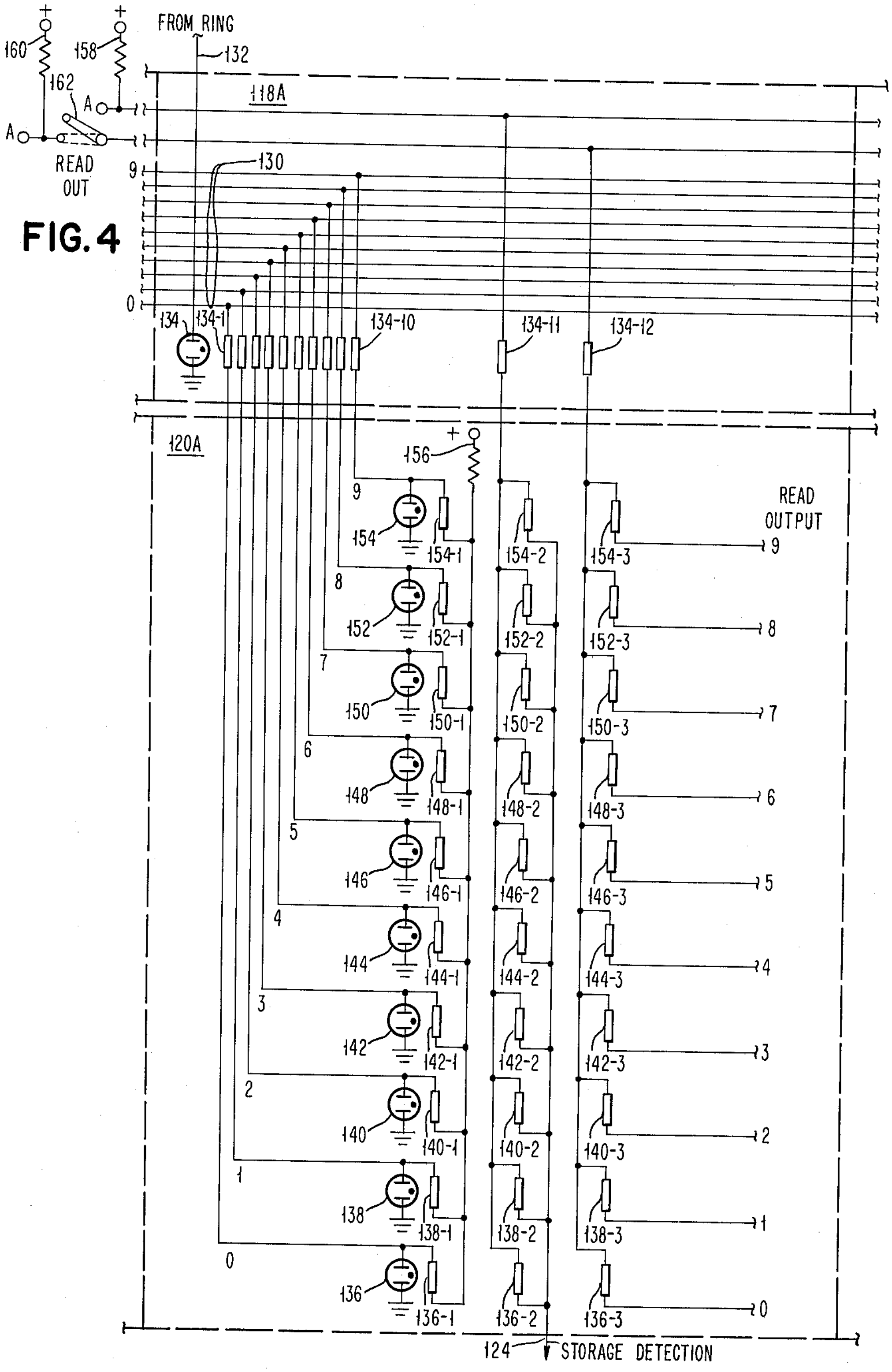

And FIGURE 4 schematically illustrates a single digit position of a photologic storage register which is used as a component in the system illustrated in FIGURE 3.

Referring in greater detail to the drawings, FIGURE 1 is a simple schematic embodiment illustrating the principles of this invention. In particular, FIGURE 1 illustrates a system in which two numerical values may be added to derive a sum value. This logic is accomplished by means of lamps 10, 12, 14 and 16 together with associated photoconductors. A first multi-valued quantity, as indicated by the operation of one switch of the set of switches indicated at 18, is transmitted by the operation of lamp 10 to the lamps 12, 14 and 16. The quantity represented by the setting of one of the information switches 20 is combined at the stage including lamps 12, 14 and 16 with the quantity represented by the setting of the switches 18, and the combination value is indicated by the operation of one of the lamps 22, 24, 26 and 28. The last mentioned lamps operate as switching devices to provide an output value to one of the output terminals 30, 32, 34 and 36. Operation of any one of the lamps 22 to 28 also provides a completion signal at the output terminal 38. The completion signal is in the form of a ground connection which is also carried back through the conductor 40 to de-energize lamp 10. The de-energization of lamp 10 causes all of the other lamps to be extinguished so that the apparatus is ready for another operation cycle.

Throughout the drawings, where lamp and photoconductor switching devices are illustrated, rectangular symbols such as are indicated at 10–1, 10–2, 10–3 and 10–4 are used to signify devices which have photoresponsive properties. These devices are commonly referred to as photoconductors. Since they are devices which have a lowered impedance when they are illuminated, they are more accurately described as photoresponsive impedance devices, but the popular "photoconductor" term is used in this specification. The preferred photoconductor devices will be described more fully below. Throughout the drawings the convention is followed that each photoconductor device is illuminated only by the first lamp positioned to the left of that photoconductor in the drawing. Thus, both photoconductors 12–1 and 12–2 are illuminated only by lamp 12, and they are not illuminated by lamp 14. Each vertical level of lamp photoconductor switching devices will sometimes be referred to below as constituting a "stage," and the entire combination may be referred to as a series of stages. For each stage there is a separate energizing circuit including an input terminal and a resistor. This energizing circuit is indicated at the first stage at 42, for the second stage at 44, and for the third stage at 46. In each instance, the input terminal with the plus (+) sign signifies a connection to a conventional D.C. power source (not shown). The power source may be common for all of the stages if it has sufficient capacity. The resistors will be discussed more fully below. Another energizing circuit is provided as indicated at 48 to supply an appropriate output voltage signal on the output terminals 30 through 36. It is anticipated that these terminals may be connected to actuate other lamp-photoconductor switching devices (not shown).

The information input switches 18 signify schematically any appropriate information input switching apparatus. This statement is true also of information input switches 20. It is contemplated, for instance, that the information may be obtained instead from lamp-photoconductor switching devices which have been used to store the information.

A momentary starting switch is indicated at 50 for the purpose of connecting energizing circuit 42 to the lamp 10. When lamp 10 is thus energized, it illuminates associated photoconductors 10–1 through 10–4. Photoconductor 10–1, when illuminated, effectively establishes a connection through a conductor 52 to maintain lamp 10 energized from energizing circuit 42. This is referred to as a latching circuit.

Only one of the switches 18 will be closed, indicating one of the values zero, one, or two. If the zero switch is closed, energy will be supplied from circuit 44 through photoconductor 10–2 to energize lamp 12. Similarly, a one-value will cause the energization of lamp 14, or a two-value will energize lamp 16. If lamp 12 is energized, then it will illuminate the associated photoconductors 12–1 and 12–2. Depending on which of the input switches 20 is closed, energy is supplied from circuit 46, either through photoconductor 12–1 to lamp 22, or through photoconductor 12–2 to lamp 24. If the one-value switch of the switches 20 is closed, then the combination of the illumination of lamp 12 and the energization of the circuit connected to photoconductor 12–2 energizes lamp 24 to signify a sum value of one. This output value is signified by the energization of the output connection 32 from the circuit 48 through photoconductor 24–1. At the same time, the illumination of photoconductor 24–2 establishes a connection from the ground at 54 to the completion circuit output terminal 38. The ground connection through photoconductor 24–2 is also effective through connection 40 to establish a ground potential on the latching circuit 52 for lamp 10. The lamp 10 is thus de-energized, and the illumination provided by this lamp decays, and the photoconductor 10–2 then becomes resistive to de-energize lamp 12. This causes the photoconductor 12–2 to become resistive, de-energizing the lamp 24. The entire system of FIGURE 1 is thus released and ready for the next operation which will presumably involve new settings of the information input switches 18 and 20 and another start pulse provided from switch 50. Switch 50 is intended as a schematic representation of a start pulse switching device. It will be understood that the start pulse may be derived from an automatic switching source which may include a lamp-photoconductor switching device.

It will be apparent, by analogy, that the combination of a two-value input from switches 18, and a one-value input from switches 20, will result in the operation of lamps 10, 16, and 28 to provide a sum value of three signified by an output at terminal 36. The other combinations of input values will similarly result in an output at the appropriate output terminal.

It will be observed that in the timing of the operation of the various stages, the second stage represented by lamp 12 will be energized as rapidly as the characteristics of lamp 10, photo-conductor 10–2, and lamp 12 will allow. Similarly, if lamp 24 is the third stage lamp to be illuminated, lamp 24 will be illuminated as rapidly as the characteristics of lamp 12, photoconductor 12–2, and lamp 24 will allow. The progression operation of these various stages is not dependent upon, and need not wait for, the occurrence of timing pulse signals. Furthermore, as soon as the lamp 24 is energized and illuminated (or as soon as any of the other third stage lamps are illuminated) a completion signal is available which de-energizes the entire circuit by de-energizing lamp 10. Thus the circuit is quickly available for new information.

FIGURE 1*a* represents a typical timing diagram showing the sequence of individual turn-on times for the lamp-photoconductor combination of each of the various stages, and the corresponding turn-off times so that the total system operating cycle time is indicated. FIGURE 1*a* may be further characterized as a photoconductor photoconductivity characteristic diagram in which the composite photoconductivity rise times and decay times are shown. Thus, the curve 56 in FIGURE 1*a* indicates the characteristic of rise in photoconductivity of a photoconductor such as 10–2 of FIGURE 1, after the lamp 10 is illuminated at the time indicated by the origin line 58. As soon as the conductivity rises to the level on curve 56 indicated by point 60, it is sufficient to cause illumination of lamp 12, and thus the horizontal distance between the origin line 58 and the point 60 may be characterized as a turn-on time for a single stage. It is at this point in the time of operation of the system that the next photoconductor rise time commences. This is signified, for instance, by the curve 62 which may represent the rise in photoconductivity of photoconductor 12–1. This photoconductor will then turn on lamp 22 and the resultant rise in photoconductivity of photoconductors 22–1 and 22–2 is represented by curve 64. However, as the photoconductivity of photoconductivity of photoconductor 22–2 rises to the point indicated by the dimension line 66, the ground connection which it provides between grounding terminal 54 and the latching circuit 52 for lamp 10 is sufficient to extinguish lamp 10. Accordingly, the photoconductivity of photoconductor 10–2 then begins to decay as indicated by the decay curve 56A. When this decay in photoconductivity proceeds to the point indicated at 68, lamp 12 is extinguished and the photoconductivity of photoconductor 12–1 begins to decay as indicated by curve 62A. This in turn causes lamp 22 to be extinguished and curve 64A represents the decay in photoconductivity of photoconductors 22–1 and 22–2. Thus, all of the lamps and photoconductors are restored to their original condition, and the circuit is ready for its next operation.

As previously mentioned above, although the photoresponsive devices as illustrated in the embodiments of this invention are referred as "photoconductors" it should be emphasized that these devices, as employed in the system of the present invention, are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the description of the circuits, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources may be electroluminescent devices, or incandescent filament devices, or devices employing gaseous discharges to derive illumination from fluoroescent coatings. In each instance, photoconductive devices are selected which are particularly responsive to the spectrum of light emitted by the light source employed. Fortunately, the neon lamps mentioned above and the photoconductive devices mentioned above work well together. Accordingly, the neons are preferred and the light sources in the present specification are all indicated as being neon light sources, but it will be understood that other sources may be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. Although impedance values for the various circuit components are not specified, it will be understood that whenever operation is required to provide output illumination, the series impedances for the various neons generally will be chosen as to result in a neon current in the order of one milliampere.

In order to simplify the drawings and make them clearer and more easily understood, the lamp shunt impedances are omitted from the drawings; but it will be understood that such impedances are to be employed in the practical embodiments of the invention. Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. With other light sources, other voltages and frequencies may be employed. Conventional sources of power may be employed to obtain satisfactory operation of the systems of the present invention.

The photoconductors such as are disclosed here possess operating characteristics which vary rather widely. Thus, the operating speeds of some photoconductors are likely to be as much as twice as great as the operating speeds of others. Furthermore, the operating speed of a particular photoconductor may vary drastically in response to variations in ambient temperature and ambient illumination. It is because of these variations in operating times that the present invention is of particular merit for systems employing these components. This is true because the system is free to operate at the most rapid possible speed which each of the components will provide.

In view of the above, it will be appreciated that the operating speeds illustrated by the diagram of FIGURE *1a* is idealized because they are shown as perfectly uniform. In practice, the photoconductors are usually reasonably uniform in operating characteristics, but not perfectly uniform.

It will be understood, of course, that any desired number of stages may be employed in the systems of the present invention. Generally such systems are intended to have more than the three stages illustrated by FIGURES 1 and 1*a*. For instance, FIGURE 1*b* shows the theoretical photoconductivity curves for the operation of a system similar to that of FIGURE 1 which employs seven stages rather than three. The principles of operation are identical to those explained in connection with FIGURES 1 and 1*a*. Therefore, no further elaboration is given here on the features illustrated by FIGURE 1*b*. It will be observed, however, that since the individual photoconductor decay times are much greater than the rise times, the decay times of the added stages contribute much more to the increase in total system cycle time than do the rise times. The problem of the prolonging of the total system operating time through the addition of decay periods when enlarging the system has been overcome by the modified embodiment illustrated by FIGURE 2. For this reason the FIGURE 2 embodiment illustrates the preferred form of this invention.

In the system of FIGURE 2, all of the decay periods run simultaneously because all of the stages of the system are shut off in response to the operation of the last stage. The operating cycle for this modified embodiment of FIGURE 2 is illustrated in FIGURE 2*a* and the operating cycle having an enlarged version corresponding to that of FIGURE 1*b* is illustrated in FIGURE 2*b*.

The system of FIGURE 2 is quite similar to that of FIGURE 1 and each of the components of FIGURE 2 which has an exact counterpart in FIGURE 1 is lettered the same as in FIGURE 1. The three stages including the lamps 10, 12 and 22 are very much the same in FIGURE 2 as they are in FIGURE 1. However, the completion signal output available at output terminal 38A which is supplied through photoconductors 22–2, 24–2 and 28–2 is provided with a voltage signal from a power source indicated at 74, rather than a ground signal. This power signal is also supplied through the connection 40A to a pulse generator 76. The pulse generator may be of conventional construction and is not shown in detail here. However, the pulse generator 76 is preferably constructed in accordance with the teachings of a prior patent application, Serial No. 120,702, filed on June 29, 1961 by René H. Terlet for "Two-State Circuits and Systems" and assigned to the same assignee as the present application. The pulse generator 76 may be described basically as a "single shot" pulse generator which emits a single timed pulse each time it is supplied with an input signal regardless of the duration of the input signal. This assumes, of course, an input signal of sufficient minimum duration to properly energize the pulse generator. The pulse generator 76, particularly if it is constructed in accordance with the teachings of the above patent application Serial No. 120,702 may be regarded as an additional stage in the system of FIGURE 2. The output pulse of the pulse generator 76 is supplied to a lamp 78, and each of the associated photoconductors 78–1 through 78–5 is connected to provide a grounding connection from 80 to one of the energizing circuits. Thus, the latching circuit including connection 52 for lamp 10 is grounded through photoconductor 78–5, the energizing circuit 44 for the second stage is grounded through photoconductor 78–4, the energizing circuit 46 for the third stage is grounded by photoconductor 78–3, the energizing circuit 48 for the output is grounded by photoconductor 78–2, and the energizing circuit 74 for the pulse generator 76 is grounded by the photoconductor 78–1. These grounding photoconductors are all illuminated simultaneously by the lamp 78 and accordingly the grounding circuits themselves are effective substantially simultaneously (within the limits of the variations of their individual operating characteristics).

As mentioned above, FIGURE 2*a* illustrates the idealized timing diagram showing the variations in photoconductivity of the various controlling photocondutcors of the system of FIGURE 2. It is to be observed that the turn-on portion of this timing diagram is quite similar to that of FIGURE 1*a*, with the exception that there are two additional turn-on cycles as indicated at 82 and 84. These indicate the turn-on cycles for the two stages represented respectively by the pulse generator 76 and the lamp 78. As the photoconductivity of the photoconductors associated with lamp 78 rises, as indicated by curve 84, at the point indicated by the timing line 66A where the photoconductivity becomes great enough to extinguish the various lamps whose energizing circuits they are grounding out, then the decay in photoconductivity of all of the photoconductors commences and continues substantially simultaneously as indicated by the decay curve 86. In order to provide fail-safe operation, the pulse generator 76 preferably provides a pulse which is long enough to maintain the lamp 78 energized for a sufficient period to provide the grounding signal until all of the lamps are completely switched off. This prolongation of photoconductivity of the 78 photoconductors is not illustrated in FIGURE 2*a*. This assures that the latching circuit 52 cannot re-establish the energization of lamp 10.

FIGURE 2*b* illustrates the operation of a larger system having nine stages, but following the principles of FIGURE 2 in which all of the stages are grounded substantially simultaneously. The nine stages correspond to the seven stage operating cycle illustrated by FIGURE 1*b*, including the two additional stages for the pulse generator 76 and the lamp 78 which illuminates the grounding photoconductors. It will be seen from a comparison of the various FIGURES 1*a*, 1*b*, 2*a* and 2*b* that in spite of the fact that FIGURE 2 involves the addition of two new stages, the total system operating time as illustrated in FIGURE 2*a* is actually less than the total operating time of FIGURE 1 as illustrated in FIGURE 1*a*. But the improvement in operating time provided by the modification illustrated in FIGURE 2 is much more striking for the larger systems having more stages as illustrated in FIGURES 1*b* and 2*b*. Thus, the total system operating time shown in FIGURE 2*b* is increased over the operating time indicated by FIGURE 2*a* only by the additional turn-on times of the added stages, whereas the additional operating time for the system of FIGURE 1*b* is increased not only by the turn-on times, but also by additional turn-off times for the added stages. Thus, it is quite apparent that the system modification illustrated by FIGURE 2 presents considerable advantages over the form of the system illustrated in FIGURE 1.

FIGURE 3 incorporates by reference FIGURES 3*a* and 3*b* forming a schematic diagram which illustrates a more complete and useful embodiment of the present invention as it is applied to a system for accomplishing serial digit by digit addition. In this system, decimal digits are stored and transmitted in a "one-out-of-ten" code. By this it is meant that a signal is provided on only one of ten lines to indicate the correct decimal value. Briefly stated, the operation of the system of FIGURE 3 is as follows: Ring circuits 96 and 98, illustrated at the left of the figure, control the gating and reading out of decimal digits to be added from the storage registers respectively indicated at 100 and 102. The digit readout from register 100 is transmitted to the driver stage 104, which is the equivalent of an amplifier, and is then transmitted on to an input stage 106. At this point it is combined with information supplied from a carry-borrow storage unit 108 and the combined output is supplied to an addition matrix 110. Similarly, the digit which is supplied from the register 102 is directed through a driver stage 112 to the addition matrix 110. In the addition matrix 110, the two digits are combined to form a sum, the value of which is indicated by a signal on one of the twenty-addition matrix output lines, the possible values being from zero to nineteen. This sum signal is supplied by the addition matrix 110 to an output stage 114. The output stage 114 is effective to detect whether or not there should be a decimal carry and to supply a signal on one or the other of the lines indicated above the output stage at 116 to the carry-borrow storage unit 108. Unit 108 then stores the information as to whether or not there is to be a carry. The output stage 114 also provides a decimal sum digit through a register gate unit 118 to a storage register 120. The digit position of the storage register 120 which receives the sum is determined by a ring 122 which controls the register gate 118.

When the digit is stored in the result storage register 120, an output signal indicating the completion of the cycle of operation of the system is available at a connection 124 which energizes a a pulse generator 126. The pulse generator 126 is similar to the previously described pulse generator 76 shown in FIGURE 2 and it provides a pulse of predetermined duration to a shut-off stage including a lamp 128. The photoconductors associated with lamp 128 apply ground connections to the energizing circuits of all of the stages of the system to clear the system for operation with the next input digits. This completion signal also causes the advance of each of the rings 96, 98 and 122 to connect the registers 100 and 102 for readout of each of the next higher order digits of the numbers to be added, and to connect the next higher order digit position of the result storage register 120 to receive the next higher order digit of the sum. The completion signal from the 128 photoconductor is also supplied to the carry-borrow storage unit 108 where it is effective to transmit the next carry-borrow signal information (which was just stored) to the input stage 106, and to clear the input side of the carry-borrow storage unit to receive the next carry or borrow signal on its input connections 116. Since so many of the completion signals are provided from the shut-off stage including lamp 128, in order to simplify the diagram, these completion signal lines are not wired in, but instead, each location where a completion signal is to be received is marked with the letter "A."

From the above explanation, it is apparent that the simultaneous grounding shut-off signals signified by the letter "A" connections not only provide for a rapid release of the entire system, with all of the stages being released substantially simultaneously, but these completion signals also accomplish an additional control function of readying the system and actually causing the system to start on its next cycle of operation by resetting the rings 96, 98 and 122 and by also stepping the operation of the carry-borrow storage unit 108. Therefore, after the end of the pulse emitted by the pulse generator 126, the rings are again active to cause the emission of the next digit signals so that the system continues to proceed in a re-cycling operation at its own asynchronous pace. Means are also provided (though not illustrated) for detecting the completion of the last of the re-cycling optrations which are necessary to accomplish the complete summing of the numbers stored in registers 100 and 102, and for causing a larger system, of which the present system of FIGURE 3 is only a part, to proceed to the next operation. It is quite apparent that the larger system itself may operate in a similar asynchronous manner. Further, it is also quite apparent that a series of operations of the system of FIGURE 3 may constitute the equivalent of only a single operation with respect to the organization of the larger system of which FIGURE 3 is a part.

FIGURE 3 also illustrates another very important feature of this invention. The rings 96 and 98 are reset and started upon a new cycle of operation substantially simultaneously. However, they represent two input channels to the system through the drivers 104 and 112. Furthermore, the carry-borrow storage unit 108 is also reset to emit a new carry-borrow output signal to the input stage 106 at the same time that the ring 96 is reset. The information available from these three separate input channels must be combined to provide the appropriate outputs in the addition matrix 110, et seq. However, in terms of lamp-photoconductor turn-on cycles, these three information channels are substantially different in length. For instantce, if the carry-borrow storage unit 108 is constructed as described below, the signal transmission time from the carry-borrow storage unit to the input stage 106 is only one lamp-photoconductor turn-on time after the end of the reset pulse. But the signal transmission time, on a similar basis, from the channel represented by ring 96 amounts to two lamp-photoconductor turn-on times. These turn-on times are represented by the ring stage position in the ring 96 and the turn-on time of the appropriate unit of the driver 104. It is almost inevitable therefore that the signal from the carry-borrow storage unit 108 will arrive at the input stage 106 before the signal from the information channel including driver 104 arrives. However, in this asynchronous system, this difference in signal arrival time is of no consequence since the 108 output signal remains on, and the input stage 106 operates as a logical "AND" circuit so that the output is available from the 106 stage only after the information from both inputs is available. However, this is in sharp contrast to many of the prior art synchronous systems with timing clocks. In such systems it would be necessary to insert a one cycle delay unit between the carry-borrow storage unit 108 and the input stage 106 so that the signal from 108 would be properly delayed to arrive at stage 106 simultaneously with the signal from the driver 104. Similarly, the length of the information channel represented by ring 98 differs from the length of the information channel represented by ring 96 in terms of the number of stage turn-on periods which are necessary to transmit the information through these respective channels to the point where the signals converge at the addition matrix 110. The number of stage turn-on periods from ring 96 to addition matrix 110 is three, and the number of stage turn-on periods from the ring 98 to addition matrix 110 is only two. However, the addition matrix 110 is operable in a manner similar to an "AND" circuit so that if one of the input signals arrives later than another, it simply "waits" to provide an output signal after the arrival of the latest of the input signals. Therefore, it is not necessary to provide a delay stage between driver 112 and matrix 110 in order to assure that the two input signals arrive simultaneously at the addition matrix 110. This principle of the present invention is very important. It is quite obvious that the difference in the logical stage length of various signal channels which are to be later converged and combined may be much greater than indicated in the present illustrative system, without causing any malfunction or inconvenience. Any desired delay may be incurred without the necessity of building in a prescribed number of delay periods to assure coincident timing of the ultimately converged signals.

Each of the rings 96, 98 and 122 may preferably be constructed in accordance with the teachings of patent application Serial No. 127,301, now Patent No. 3,157,791, filed July 27, 1961, by René H. Terlet for "Multi-State Circuits" and assigned to the same assignee as the present application. The structure best adapted for use in the present system is illustrated in FIGURE 2 of that patent application. The details of the structure of the ring circuits therefore are not shown in the present application. However, the operation of all of the components and of the total system of FIGURE 3 will be described in somewhat more detail below. The registers 100, 102 and 120 will be described below in more detail in connection with FIGURE 4.

The driver stages 104 and 112 are in the nature of lamp-photoconductor amplifiers, each driver stage consisting of one neon lamp for each input connection and one photoconductor for supplying each output signal. The input stage 106, taken together with the driver stage 112, the addition matrix 110, the output stage 114, and the carry-borrow storage unit 108 constitute an "Addition" system which forms a portion of the subject matter of a separate patent application, Serial No. 72,489, filed November 29, 1960, by Rex Rice and assigned to the same assignee as the present application. That application has now matured into U.S. Patent 3,138,704, "Photologic Arithmetic Circuits," which issued on June 23, 1964. Accordingly, these components and their interconnections are not shown in complete detail in the present application as they are intended to be substantially as shown in that application. There is one exception to this, however. The carry-borrow storage unit 108 is preferably constructed in accordance with the teachings of copending patent application Serial No. 135,063 filed August 30, 1961, by René H. Terlet and assigned to the same assignee as the present application. The last-mentioned copending patent application has matured into U.S. Patent 3,150,265, "Multistable Apparatus," which issued on September 22, 1964. The preferred form of apparatus for the carry-borrow storage unit 108 of the present system is the form shown in FIGURE 2 of that prior application.

The register gate 118 consists of a series of photoconductor AND circuits, one for each digit position of the register 120, for the purpose of causing the storage of sum digits in the register 120 in the register digit position determined by ring 122. Register gate 118 and register 120 will be further described in connection with FIGURE 4. The pulse generator 126 is preferably constructed similarly to the pulse generator 76 shown in FIGURE 2 and in accordance with the teachings of the previously mentioned copending patent application, Serial No. 120,702. A more detailed explanation of the operation of the system of FIGURE 3 is given below. To assist in an understanding of the more detailed operation, reference is now made to the structure and operation of the portion of the system shown in FIGURE 4.

FIGURE 4 is a schematic diagram showing the details of one digit position of a register, such as register 120 of FIGURE 3, together with one digit position of the register gate 118. The register digit position is designated as a whole as 120A in FIGURE 4, and the register gate portion is designated as a whole as 118A. The ten input lines to the register gate are indicated at 130. When the particular digit position represented by the apparatus shown in FIGURE 4 is to receive the information on the input lines 130, then a signal is received on a ring line 132 from the ring position controlling the gate 118. The ring signal on 132 energizes a lamp 134 of the gate, and the associated photoconductors 134–1 through 134–12 are illuminated and rendered conductive. Accordingly, whenever the input signal is available on the connection 130, it is transmitted through one of the photoconductors 134–1 through 134–10 to one of the storage lamps 136 through 154. The storage lamp which receives the signal is latched and held in the illuminated condition by the operation of its first associated photoconductor (136–1 - - 154–1) through energy derived from the energization circuit indicated at 156. At the same time, the associated photoconductor (one of the photoconductors 136–2 - - 154–2) becomes conductive to provide a storage detection or completion signal at 124. The power for this signal is gated through the gate photoconductor 134–11 from a power source indicated at 158. It is a particularly important feature of the invention that the completion signal is available on conductor 124 only after the information has been safely stored in the register position 120A in one of the lamps 136 through 154. Thus, the entire system of FIGURE 3 is not turned off and shifted for the next operation until the storage of the present digit of the answer has been completed.

Whenever it is desired to read information out of the register, then a readout circuit may be energized from the energy source indicated at 160 by closure of the switch schematically illustrated at 162. Readout of only one digit at a time is assured by control of the readout through the gate 118A by means of gate photoconductor 134–12. When this readout energization circuit is complete through the gate photoconductor 134–12, then a readout signal will appear at one of the output lines which is energized through one of the photoconductors 136–3 through 154–3, depending on the value stored in the register. This readout mode of operation illustrates the mode of operation expected from registers 100 and 102 of FIGURE 3. For purposes of simplicity and brevity, in FIGURE 3, the gate stages have been omitted for registers 100 and 102 and these registers are shown as being operated for readout directly from the ring signal. However, it will be understood that it is intended that there should be a gate stage, such as illustrated in FIGURE 4, between the ring 96 and the register 100 and between the ring 98 and register 102. Again, for simplicity, the write-in circuitry is not shown in FIGURE 3 for registers 100 and 102, and the readout circuitry is not shown for register 120. FIGURE 4 represents only a single digit position of the register and the associated gate, but the other digit positions which may be connected to the left and to the right of the circuit of FIGURE 4 are substantially identical in construction.

Referring back to FIGURE 3, it is to be observed that the number of photoconductor stages involved in the operation of the longest data path in the system is approximately nine, so that the system timing diagram shown in FIGURE 2*b* is directly applicable to the operation of FIGURE 3.

The following is a more detailed example illustrating the operation of the system of FIGURE 3. When the rings 96, 98, and 122 are rendered operative by the release of the prior completion signal (designated by the letters A), one of the lamp-photoconductor combinations therein is rendered operative. For example, in ring 96 lamp 200 is illuminated and photoconductor 202 rendered conductive, while in ring 98 lamp 204 is illuminated and photoconductor 206 rendered conductive. Then the next digit position of each of the registers 100, 102 and 120 becomes effective. Suppose, for instance, that a decimal "eight" is stored in the operative digit position of register 100, as indicated by illumination of a lamp 152B. Photoconductor 208 would be rendered conductive, thereby allowing energy to be applied to lamp 166. Then the eight lamp 166 of the driver 104 is energized, causing photoconductor 210 to conduct, thereby illuminating lamp 168 of the input stage 106. If, however, a decimal "9" had been stored in the operative digit position of register 100, as indicated by illumination of lamp 154B, photoconductor 212 would go conductive and lamp 214 would be energized. Photoconductor 216, similar in function to photoconductor 210, would conduct and illuminate a lamp corresponding to lamp 166 in register 104, but not shown for simplicity's sake.

The system is assumed to have been set to accomplish addition by the appropriate setting of a switch at the carry-borrow storage unit 108 which is schematically illustrated at 170. As explained more fully in the previously mentioned U.S. Patent 3,138,704, the system may be employed either for subtraction or addition. At the time of the initiation of the operation of the rings, the carry-borrow storage unit 108 is also activated to emit a signal indicating whether or not a carry should be counted from the prior digit addition. Assuming there is no carry, a signal is available from the carry-borrow storage unit 108 to the photoconductor 168–2 associated with lamp 168 of the input stage of 106. Therefore, as soon as the 168 lamp comes on ,a signal is available through 168–2 on the eight line from stage 106 to the addition matrix 110, causing the illumination of a lamp 172 within matrix 110. Lamp 172 is only one of the eleven lamps contained within the addition matrix 110.

If a decimal "eight" value is also stored in the operative digit position of register 102, then the activation of ring 98 causes the emission of the signal through the photoconductor 218 associated with lamp 152C to one of the ten lamps in the driver 112 indicated at 174. A signal is then obtained from the photoconductor 220 associated with lamp 174 to energize the photoconductor 172–9 associated with lamp 172 in the addition matrix 110. If, however, a decimal "9" value had been stored in register 102, then the activation of ring 98 would cause the emission of a signal through photoconductor 222 associated with lamp 154C to lamp 224 and driver 112. Photoconductor 226 would then conduct. The coincidence of the signals on lamp 172 of the addition matrix, and on the associated photoconductor 172–9 provides for the transmission of a signal to the output stage 114 at the lamp 176. Lamp 176 is the one of the twenty lamps within the output stage 114 which signifies a sum value of sixteen. As previously mentioned, the output stage 114 separates this result into a decimal sum digit six plus a carry digit of one. The sum digit six component is supplied through the associated photoconductor 176–1 to the register gate 118. This signal is switched through the appropriate register gate section, such as through the operation of a gate lamp as indicated at 134C, to energize the appropriate storage lamp 148C within the register 120. Meanwhile, the carry signal from output stage 114 is derived through photoconductor 176–2 and supplied through that photoconductor back through one of the connections 116 for storage and future use in the carry-borrow storage unit 108.

In register 120, the lamp 148C is latched in the energized condition through the operation of associated photoconductor 148C–1 and a storage detection completion signal is provided on the output line 124 by means of the circuit from the energy source indicated at 158 through the photoconductors 134C–11 and 148C–2. As previously described, the completion signal on connection 124 energizes the pulse generator 126, which then emits a pulse which energizes lamp 128. The 128 photoconductors then provide system shut-off and shift connections to all of the various required points indicated by the letter A.

As mentioned above, FIGURE 3 is a schematic representation of the complete system and it will be apparent that, for many purposes, it will be necessary to provide additional digit storage positions in each of the registers 100, 102 and 120. Also, it may be necessary to enlarge the system in certain other respects, such as by the provision of additional driver stages and additional gating stages. As mentioned previously above, for instance, an additional register gate may be provided between ring 96 and register 100, and also between ring 98 and register 102, just as the register gate 118 is provided between ring 122 and register 120.

It is apparent that a system such as FIGURE 3, even though it requires the operation of a number of data channels, will operate reliably at as rapid a speed as possible to obtain each digit sum, and will then proceed expeditiously to derive the next higher order digit sum, etc. If any particular component or stage in any chain of data transmission within this system happens to be slower than the others, the system simply accommodates for any such delay and proceeds when the resultant signal is received.

As described more fully in the previously mentioned U.S. Patent 3,150,265, the input stage 106 will add one to the quantity at the input side, if a carry is called for, and accordingly the output of the input stage 106 to the addition marix 110 will be one higher than the input. If the system is to be operated for subtraction rather than addition, then the input stage 106 is operable to supply to the addition matrix 110 the complement of the digit value input. This complement value is adjusted to reflect either a "borrow" condition or "no borrow" from the prior digital order.

It will be apparent to those skilled in the art that systems for the accomplishment of many different logical functions may be devised employing the principles of the present invention. For instance, by suitable modification, systems can be devised for multiplication, or division, or derivation of square roots, etc. All of such systems may be designed to employ the asynchronous principles of this invention with an asynchronous completion signal at each step for causing progression of the system to the next step of operation.

While the invention has been particularly shown and described with reference to preferred embodiments thereof, it will be understood by those skilled in the art that various changes in form and details may be made therein without departing from the spirit and scope of the invention.

What is claimed is:

1. An asynchronous information handling system comprising at least one chain of logical stages, energizing means for each of said stages, each of said stages comprising at least one switching device, at least some of said stages comprising a plurality of switching devices, each of said switching devices being operable in response to completion of a circuit from its energizing means, each said operable switching device being effective to complete an information transfer circuit from the energizing means for a succeeding stage to one of said switching devices for said succeeding stage, means for completing the energizing circuit from said first stage energizing means for initiating and maintaining the operation of one of said switching devices of said first stage, said stages being interconnected to ultimately cause the operation of a single final stage, and means connected for response to operation of any of said switching devices of said final stage for disabling said energizing means for said first stage to release said system for the reception of further information.

2. An asynchronous information handling system comprising a chain of logical stages, a single energizing means for each of said stages, each of said stages comprising at least one switching device, at least some of said stages comprising a plurality of switching devices, each of said switching devices being operable in response to completion of a circuit from its energizing means, each said operable switching device being effective to complete an information transfer circuit from the energizing means for the next succeeding stage to one of said switching devices for the next succeeding stage, information input means for completing an energizing circuit from said first stage energizing means for initiating and maintaining the operation of one of said switching devices of said first stage, and switching means connected for operation in response to operation of any of said switching devices of the last stage for disabling said energizing means for said first stage to release said system.

3. An asynchronous information handling system comprising
a chain of logical stages,
a single energizing means for each of said stages,
each of said stages comprising a plurality of switching devices,
each of said switching devices being operable in response to completion of a circuit from its energizing means,
each said operable switching device being effective to complete an information transfer circuit from the energizing means for the next succeeding stage to one of said switching devices for the next succeeding stage,
information input means for completing an energizing circuit from said first stage energizing means for initiating and maintaining the operation of one of said switching devices of said first stage,
and means connected for response to operation of any of said switching devices of the last stage for substantially simultaneously disabling said energizing means for all of said stages to release said system for the reception of further information.

4. An asynchronous information handling system comprising
at least one chain of logical stages,
a single energizing means for each of said stages,
each of said stages comprising at least one switching device, at least some of said stages comprising a plurality of switching devices,
each of said switching devices being operable in response to completion of a circuit from its energizing means, each said operable switching device being effective to complete an information transfer circuit from the energizing means for a succeeding stage to one of said switching devices for said succeeding stage,
means for completing the energizing circuit for initiating and maintaining the operation of one of said switching devices of said first stage,
at least one of said stages including information input means,
one of the later stages comprising a latch stage for storing the information being handled,
and means connected for response to operation of any of said switching devices of the last stage for disabling said energizing means for all of said stages except said latch stage substantially simultaneously.

5. An asynchronous information handling system comprising
at least two chains of logical stages which converge into a single chain,
energizing means for each of said stages,
each of said stages comprising at least one switching device,
at least some of said stages comprising a plurality of switching devices,
each of said switching devices being operable in response to completion of a circuit from its energizing means,
each said operable switching device being effective to complete an information transfer circuit to a succeeding stage,
at least one of the early stages of each of said two chains being comprised of a read-out circuit of an information storage means,
means for completing the energizing circuit for initiating and maintaining the operation of one of said switching devices of the first stage,
one of the later stages comprising a storage means for storing the information being handled,
and means connected for response to operation of any of said switching devices of a stage following said storage means for disabling said energizing means for all of said stages except said storage means substantially simultaneously.

6. An asynchronous information handling system comprising
a plurality of chains of logical stages which converge into a single chain,
energizing means for each of said stages,
each of said stages comprising at least one switching device,
at least some of said stages comprising a plurality of switching devices,
each of said switching devices being operable in response to completion of a circuit from its energizing means,
each said operable switching device being effective to complete an information transfer circuit to a succeeding stage,
each of said information transfer circuits being effective to complete an energizing circuit for a switching device in a succeeding stage,
means for completing the energizing circuit for initiating and maintaining the operation of one of said switching devices of the first stage,
one of the later stages of said single converged chain comprising a latching stage for storing the information being handled,
and means connected for response to operation of any of said switching devices of the last stage for disabling said energizing means for all of said stages except said latching stage substantially simultaneously.

7. An asynchronous information handling system comprising
a plurality of stages,
said stages comprising at least two ring circuits,
an individual storage register associated with each of said ring circuits,
each of said storage registers including a plurality of digit storage positions with a plurality of devices in each of said digit positions to represent different digit values,
each of said ring circuits being connected with the associated storage register to initiate a read out of the information in a selected digit position of said storage register,
said system including logical stages responsive to the information read out of said storage registers for generating combined function signals representing combined functions of information read out from said storage registers,
a third register having a register gate circuit stage and a ring circuit stage associated therewith,
said last mentioned ring circuit being operable to control said register gate circuit,
said register gate circuit being connected to receive said combined function signals and to transmit said signals for storage in said third register in a digit position determined by the operation of said third ring circuit,
said third register including devices for energization in response to different numerical values to be stored and operable for latching in the operative condition for the permanent storage of information,
each of said digit positions of said third register including means for providing a completion signal indicative of the completion of the storage of the information,
a pulse generator stage connected for operation in response to said completion signal,
a final stage of said system connected for operation in response to the output of said pulse generator,
said final stage having devices associated therewith connected to provide turn-off circuits for all of said stages of said system to substantially simultaneously clear said stages for the next cycle of operation,
said final stage also including devices connected to said ring circuits for advancing each of said ring circuits to the next ring position.

8. An asynchronous information handling system comprising at least one chain of logical stages, energizing means for each of said stages, each of said stages comprising at least one lamp-photoconductor switching device, at least some of said stages comprising a plurality of said switching devices, each of said switching devices being operable in response to completion of a circuit from its energizing means, each said operable switching device being effective to illuminate the lamp thereof to complete an information transfer circuit through a photoconductor illuminated thereby from the energizing means for a succeeding stage to one of said switching devices for said succeeding stage, means for completing the energizing circuit from said first stage energizing means for initiating and maintaining the operation of one of said switching devices of said first stage, said stages being interconnected to ultimately cause the operation of a single final stage, and photoconductors associated with each of said switching devices of said final stage connected for shunting and disabling said energizing means for said first stage to release said system for the reception of further information.

9. An asynchronous information handling system comprising:

a chain of logical stages;

a single energizing means for each of said stages;

each of said stages comprising a plurality of lamp-photoconductor switching devices;

each of said switching devices in any of said stages being operable in response to completion of a circuit from said energizing means connected to each said stage;

each said operable switching device being effective to illuminate the lamp thereof to complete an information transfer circuit through a photoconductor illuminated by said lamp from said single energizing means for the next succeeding stage to one of said switching devices for the next succeeding stage;

means for completing an energizing circuit from said first stage energizing means for initiating and maintaining the operation of one of said switching devices of said first stage;

and photoconductors associated with each of said switching devices of a later stage, said last recited photoconductors being operable in response to illumination of the lamps in said lamp-photoconductor switching devices for simultaneously disabling said energizing means for all of said stages and to release said system for the reception of further information.

10. An asynchronous information handling system comprising at least two chains of logical stages which converge into a single chain, energizing means for each of said stages, each of said stages comprising at least one lamp-photoconductor switching device, at least some of said stages comprising a plurality of said switching devices, each of said switching devices being operable for illumination of the lamp thereof in response to completion of a circuit from its energizing means, each said operable switching device being effective to complete an information transfer circuit to a succeeding stage through a photoconductor illuminated by said lamp, at least one of the early stages of each of said two chains being comprised of a read-out circuit, a separate information storage means associated with each of said read-out circuits, means for completing the energizing circuit for initiating and maintaining the operation of one of said switching devices of the first stage, one of the later stages comprising a lamp-photoconductor storage means for storing the information being handled, said storage means including a separate photoconductor operable in response to illumination of each of said storage means lamps, said photoconductors being connected to energize a following stage to indicate the completion of the storage operation, and means operable in response to said following stage for disabling said energizing means for all of said stages except said storage means substantially simultaneously.

11. An asynchronous information handling system comprising a plurality of chains of logical stages which converge into a single chain, energizing means for each of said stages, each of said stages comprising at least one lamp-photoconductor switching device, at least some of said stages comprising a plurality of said switching devices, each of said switching devices being operable for illumination of the lamp thereof in response to completion of a circuit from its energizing means, each said operable switching device being effective to complete an information transfer circuit to a succeeding stage through a photoconductor illuminated by said lamp, each of said information transfer circuits being effective to complete an energizing circuit for one of said switching devices in a succeeding stage, means for completing the energization circuit for initiating and maintaining the operation of one of said switching devices of the first stage, one of the later stages of said single converged chain comprising a lamp-photoconductor register for storing the information being handled, and a later stage including a plurality of photoconductors connected for disabling said energizing means for all of said stages except said latching stage substantially simultaneously.

12. An information handling system comprising:

a plurality of stages connected in at least two converging information channels, the first stage of each of said channels comprising a ring circuit having a plurality of ring positions;

each said ring circuit having at least one voltage responsive light source and at least one photoconductor associated therewith for providing an output from each ring position;

information input apparatus associated with each of said ring circuits;

each of said ring circuits being connected to initiate the operation of the associated input apparatus;

logical stages for receiving and combining the information from said input apparatus and to converge said information channels;

said logical stages including a plurality of voltage responsive light sources selectively operable in response to the information from one said input apparatus and a plurality of photoconductors responsive to illumination from said last mentioned light sources for receiving and selectively transmitting combined function signals provided from the other of said input apparatus and representing said combined functions;

a register having a register gate circuit stage and a ring circuit stage associated therewith;

said last mentioned ring circuit stage being operable to control said register gate circuit stage;

said register gate circuit stage being connected to receive said combined function signals and to transmit said combined function signals for storage in said register in a digit position determined by the operation of said last-mentioned ring circuit stage;

said register including voltage responsive light sources for energization in response to different numerical values to be stored and a latching photoconductor responsive to each of said light sources for latching said light source in the operative condition for the storage of information;

each of said digit positions of said register including a photoconductor responsive to each light source therein for providing a completion signal indicative of the completion of the storage of the infomation;

a subsequent stage connected for operation in response to said completion signal including a voltage responsive light source, a plurality of photoconductors responsive to said last-mentioned light source and connected to provide shunt circuits for all of said stages to substantially simultaneously clear said stages for the next cycle of operation and to advance said ring circuits.

13. An asynchronous photologic information handling system comprising:

a plurality of stages, said stages comprising at least a first and second photologic ring circuit, each said ring circuit having a plurality of ring positions and each said ring circuit having at least one voltage responsive light source and at least one photoconductor associated with said light source for providing an output for each said ring position;

an individual photologic storage register associated with each of said ring circuits there being at least a first and second photologic storage register, each of said storage registers including a plurality of digit storage positions with a plurality of voltage responsive light sources in each of said digit positions to represent different values thereof;

each of said ring circuits being connected with the associated storage register to initiate a read out of the information in a selected digit position of said storage register;

said system including logical stages for receiving and generating combined functions of information read out from said storage registers;

said logical stages including voltage responsive light sources selectively operable in response to the information read out from one of said storage registers and photoconductors associated with said last mentioned light sources for receiving and selectively transmitting signals provided from the read out of the other said storage register to represent said combined functions;

a third photologic register having a register gate circuit stage and a ring circuit stage associated therewith;

said last mentioned ring circuit being operable to control said register gate circuit;

said register gate circuit being connected to receive said combined function signals and to transmit said signals for storage in said third register in a digit position determined by the operation of said third ring circuit;

said third register including voltage responsive light sources for energization in response to different numerical values to be stored;

a latching photoconductor associated with each of said last mentioned light sources for latching said light source in the operative condition for the permanent storage of information;

each of said digit positions of said third register including a photoconductor associated with each light source therein for providing a signal indicative of the completion of the storage of the information;

a pulse generator stage connected for operation in response to the output of said pulse generator;

said final stage light source having photoconductors associated therewith connected to provide shunt circuits for all of said stages of said system to substantially simultaneously clear said stages for the next cycle of operation and;

said last named photoconductors including photoconductors connected to said ring circuits for advancing said ring circuits to the next ring positions.

14. An information handling system comprising:

a plurality of stages connected in at least two converging information channels, the first stage of each of said channels comprising a ring having a plurality of ring positions;

each said ring circuit having at least one voltage responsive light source and at least one photoconductor associated therewith for providing an output from each ring position;

an individual photologic storage register associated with each of said ring circuits, each of said storage registers including a plurality of digit storage positions with a plurality of voltage responsive light sources in each of said digit positions to represent different digit values;

each of said ring circuits being connected with the associated storage register to initiate a read out of the information in a selected digit position of said storage register;

logical stages for receiving and combining the information read out from said storage registers to converge said data channels;

said logical stages including voltage responsive light sources selectively operable in response to the information read out from one of said storage registers and photoconductors associated with said last mentioned light sources for receiving and selectively transmitting signals provided from the readout of the other said storage register to represent said combined functions;

a third photologic register having a register gate circuit stage and a ring circuit stage associated therewith, said last mentioned ring circuit being operable to control said register gate circuit;

said register gate circuit being connected to receive said combined function signals and to transmit said signals for storage in said third register in a digit position determined by the operation of said third ring circuit;

said third register including voltage responsive light sources for energization in response to different numerical values to be stored and a latching photoconductor associated with each of said light sources for latching said light source in the operative condition for the permanent storage of information;

each of said digit positions of said third register including a photoconductor associated with each light source therein for providing a signal indicative of the completion of the storage of the information;

a pulse generator stage connected for operation in response to said completion signal;

a voltage responsive light source comprising a final stage of said system connected for operation in response to the output of said pulse generator;

said final stage light source having photoconductors associated therewith connected to provide shunt circuits for all of said stages of said system to substantially simultaneously clear said stages for the next cycle of operation;

and said last named photoconductors including photoconductors connected to said ring circuits in said converging information channels and associated with said third photologic register for advancing said last-recited ring circuits to the next ring positions.

References Cited by the Examiner

UNITED STATES PATENTS

| | | | |
|---|---|---|---|
| 2,851,596 | 9/58 | Hilton | 235—92 |
| 2,977,505 | 3/61 | Smith | 250—209 X |

| | | | |
|---|---|---|---|
| 2,985,763 | 5/61 | Ress | 250—208 |
| 2,998,530 | 8/61 | Marshall | 250—208 |
| 3,070,702 | 12/62 | Marko | 250—215 |
| 3,107,301 | 10/63 | Willard | 250—214 X |

OTHER REFERENCES

Low et al.: IBM Technical Disclosure Bulletin, vol. 4, No. 11, April 1962, page 60.

RALPH G. NILSON, *Primary Examiner.*

WALTER STOLWEIN, *Examiner.*